(12) United States Patent
Grieβer et al.

(10) Patent No.: US 7,991,523 B2
(45) Date of Patent: Aug. 2, 2011

(54) METHOD FOR INDIRECT TIRE PRESSURE MONITORING

(75) Inventors: Martin Grieβer, Eschborn (DE); Andreas Köbe, Bensheim (DE); Frank Edling, Yokohama (JP); Vladimir Koukes, Darmstadt (DE); Jörg Cunz, Bad Homburg (DE); Lennert Gootjes, Hannover (DE); Joachim Kohn, Hannover (DE); Ines Runge, Hensledt-Uesburg (DE); Maik Hofmann, Gaimersheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 709 days.

(21) Appl. No.: 10/587,748

(22) PCT Filed: Feb. 2, 2005

(86) PCT No.: PCT/EP2005/050450
§ 371 (c)(1),
(2), (4) Date: Aug. 9, 2007

(87) PCT Pub. No.: WO2005/072995
PCT Pub. Date: Aug. 11, 2005

(65) Prior Publication Data
US 2008/0140276 A1 Jun. 12, 2008

(30) Foreign Application Priority Data

Feb. 2, 2004 (DE) .......................... 10 2004 005 173
Feb. 2, 2005 (DE) .......................... 10 2005 004 910

(51) Int. Cl.
*G01M 17/00* (2006.01)
*G06F 7/00* (2006.01)

(52) U.S. Cl. ............................................. 701/29; 701/1
(58) Field of Classification Search ................... 701/29, 701/1; 73/146; 340/445
See application file for complete search history.

(56) References Cited

U.S. PATENT DOCUMENTS

| 7,203,579 B2 * | 4/2007 | Yokota et al. | 701/29 |
| 2002/0157461 A1 * | 10/2002 | Schmidt et al. | 73/146 |
| 2003/0038716 A1 * | 2/2003 | Piesinger | 340/445 |

FOREIGN PATENT DOCUMENTS

| DE | 69714930 | 4/1998 |
| DE | 10058140 | 1/2002 |
| DE | 10300330 | 7/2003 |
| EP | 0832768 | 4/1998 |
| EP | 0578826 | 7/1998 |
| EP | 0895880 | 2/1999 |
| EP | 895880 A2 * | 2/1999 |
| EP | 0925960 | 6/1999 |
| WO | 01/87647 | 11/2001 |

* cited by examiner

*Primary Examiner* — Khoi Tran
*Assistant Examiner* — Ian Jen

(57) ABSTRACT

Disclosed is a method of indirect tire pressure monitoring. The method includes: learning test variables (DIAG, SIDE, AXLE), which describe the rotational movements of the wheels; determining rolling circumference differences (ΔDIAG, ΔSIDE, ΔAXLE) from actually determined test variables and the learnt test variables; learning at least one torsion natural frequency $f_p$ for at least one tire from the oscillation behavior of the individual tires; determining at least one shift of the torsion natural frequency $\Delta f_p$ from at least one actually determined torsion natural frequency and from the at least one learnt torsion natural frequency; and combining the rolling circumference differences (ΔDIAG, ΔSIDE, ΔAXLE) with the at least one shift of the torsion natural frequency $f_p$ in a joint warning strategy for detecting and warning of tire inflation pressure loss.

13 Claims, 1 Drawing Sheet

METHOD FOR INDIRECT TIRE PRESSURE MONITORING

This application is the U.S. national phase of international application PCT/EP2005/050450 filed Feb. 2, 2005, which designated the U.S. and which claims the benefit of priority of German Patent Application Number 10 2005 004 910.9 filed Feb. 2, 2005 and German Patent Application Number 10 2004 005 173.9 filed Feb. 2, 2004. The contents of each of the aforementioned documents are incorporated herein in their entirety.

BACKGROUND OF THE INVENTION

The present invention relates to a method and a computer program product for indirect tire pressure monitoring including: learning of test variables (DIAG, SIDE, AXLE), which describe the rotational movements of the wheels; determining of rolling circumference differences (ΔDIAG, ΔSIDE, ΔAXLE) from actually determined test variables and the learnt test variables; learning of at least one torsion natural frequency $f_p$ for at least one tire from the oscillation behavior of the individual tires; determining at least one shift of the torsion natural frequency $\Delta f_p$ from at least one actually determined torsion natural frequency and from the at least one learnt torsion natural frequency; and combining the rolling circumference differences (ΔDIAG, ΔSIDE, ΔAXLE) with the at least one shift of the torsion natural frequency $f_p$ in a joint warning strategy for detecting and warning of tire inflation pressure loss.

In up-to-date motor vehicles, systems are employed at an increasing rate, which contribute to an active or passive protection of the occupants. Systems for tire pressure monitoring protect the occupants of a vehicle against vehicle damages, which are due to an abnormal tire inflation pressure, for example. An abnormal tire inflation pressure can also cause increase of e.g. tire wear and fuel consumption, or a tire defect (tire bursting) may occur. Various tire pressure-monitoring systems are known, which operate either based on directly measuring sensors or detect an abnormal tire pressure by evaluating rotational speed properties or oscillating properties of the vehicle wheels.

German patent application DE 100 58 140 A1 discloses a so-called indirectly measuring tire pressure monitoring system (DDS) detecting tire pressure loss by evaluating the rotational movement of the wheel.

EP 0 578 826 B1 discloses a tire pressure tester which determines pressure loss in a tire based on tire oscillations.

WO 01/87647 A1 describes a method and a device for tire pressure monitoring, combining a tire pressure monitoring system which is based on the detection of wheel radii, and a tire pressure monitoring system which is based on the evaluation of oscillation properties.

An object of the invention is to provide a method for tire pressure monitoring, which improves a known indirectly measuring tire pressure monitoring system by considering the torsion national frequencies to such effect that reliable detection of an abnormal tire inflation pressure is enhanced.

SUMMARY OF THE INVENTION

According to the invention, this object is achieved by the method for indirect tire pressure monitoring including: learning of test variables (DIAG, SIDE, AXLE), which describe the rotational movements of the wheels; determining of rolling circumference differences (ΔDIAG, ΔSIDE, ΔAXLE) from actually determined test variables and the learnt test variables; learning of at least one torsion natural frequency $f_p$ for at least one tire from the oscillation behavior of the individual tires; determining at least one shift of the torsion natural frequency $\Delta f_p$ from at least one actually determined torsion natural frequency and from the at least one learnt torsion natural frequency; and combining the rolling circumference differences (ΔDIAG, ΔSIDE, ΔAXLE) with the at least one shift of the torsion natural frequency $f_p$ in a joint warning strategy for detecting and warning of tire inflation pressure loss.

Preferably, the test variables (DIAG, SIDE, AXLE) are determined/learnt simultaneously. To economize calculation efforts of the processor/microcomputer employed, the test variables (DIAG, SIDE, AXLE) are determined/learnt consecutively in another preferred embodiment.

The determination of the rolling circumference differences (ΔDIAG, ΔSIDE, ΔAXLE) from the actually determined and the learnt test variables (DIAG, SIDE, AXLE) is preferably executed in identical speed intervals, and/or wheel torque intervals, and/or lateral acceleration intervals.

It is furthermore favorable that the learning operation takes place at the preset nominal tire pressure.

The invention is described in the following by way of several embodiments.

BRIEF DESCRIPTION OF DRAWING

In the FIGURE.

DETAILED DESCRIPTION OF THE DRAWING

Figure 1:
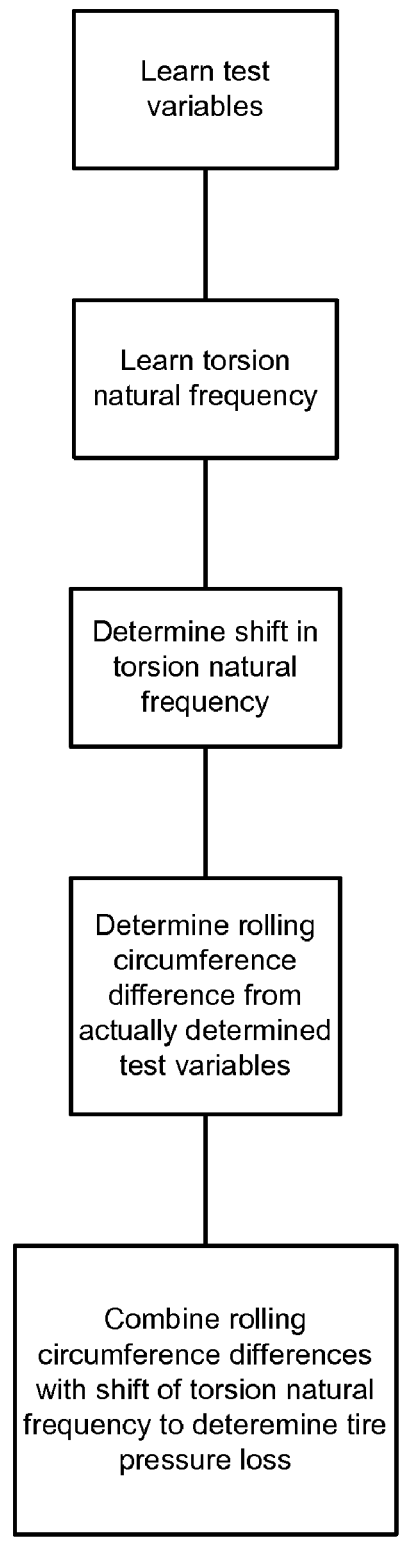
FIG. 1 is a flow chart illustrating a disclosed method.

Starting from a known indirectly measuring tire pressure monitoring system (DDS), as described e.g. in DE 100 58 140 A1, the oscillating properties of the tire are monitored. The invention makes use of the effect that the oscillating properties of the tire (e.g. the torsion natural frequency) change mainly in response to a changed tire inflation pressure.

The torsion natural frequency $f_p$ of the tire is determined e.g. with the aid of a frequency analysis (e.g. Fourier transformation) of the wheel speed signals and the subsequent determination of the frequency for which e.g. an amplitude maximum in the frequency spectrum prevails. The method of the invention is started like the indirectly measuring tire pressure monitoring system (DDS), i.e. the driver must reset the system e.g. by a key button (reset) when the tire pressures have been adapted or tires or wheels have been exchanged, respectively. A learning phase follows after the reset, and for increasing the accuracy it is recommended to provide exactly the same time for the learning operation as in the indirectly measuring tire pressure monitoring system (DDS) known in the art.

In a first preferred embodiment of the method of the invention for the indirect tire pressure monitoring, the pressure-induced variations of the rolling circumference of the indirectly measuring tire pressure monitoring system (DDS) are determined, and a warning about tire pressure loss is indicated as soon as fixed (warning) thresholds are exceeded. These thresholds are defined depending on the pressure-induced variation of the oscillating properties.

The indirectly measuring tire pressure monitoring system (DDS) is so designed that it can identify tire pressure loss at up to three wheel positions (left front wheel, right front wheel, left rear wheel, right rear wheel). Three test variables (DIAG, SIDE, AXLE) are determined simultaneously or consecutively to this end, and quantities are included in each test variable (DIAG, SIDE, AXLE), which describe the rotational movements of the wheels such as the times of rotation of a wheel rotation, the rolling circumference, etc. The test variables are basically composed of a quotient, the counter and denominator of which contain in each case the sum of two variables describing the wheel rotations. The counter of the test variable DIAG contains, for example, the sum of the variables of the wheel rotation of the two diagonally opposite wheels (e.g. left front wheel and right rear wheel), while the denominator indicates the sum of the remaining variables of the wheel rotations (e.g. front right wheel and left rear wheel). With respect to the test variable SIDE, the counter e.g. contains the variables of the wheel rotations of a vehicle side (e.g. right front wheel and right rear wheel), while with respect to the test variable AXLE, the counter contains the variables of the wheel rotations of the wheels of one axle (e.g. right front wheel and left front wheel). The denominators are respectively produced from the remaining variables of the wheel rotations. These test variables are defined in various speed intervals, wheel torque intervals, and lateral acceleration intervals or yaw rate intervals. Further, rolling circumference differences between actual and learnt values are determined for a pressure loss warning ($\Delta$DIAG, $\Delta$SIDE, $\Delta$AXLE). These rolling circumference differences are consequently determined also in the intervals from an actual value and the learning value pertaining to the actual interval.

In general, pressure losses at one tire or several tires is determined by means of the indirectly measuring tire pressure monitoring system (DDS) by evaluating the rolling circumference differences $\Delta$DIAG, $\Delta$SIDE and $\Delta$AXLE. In a particularly simple embodiment, the following condition is evaluated:

$$\text{Max1}\{|\Delta DIAG|,|\Delta SIDE|,|\Delta AXLE|\}+ \text{Max2}\{|\Delta DIAG|,|\Delta SIDE|,|\Delta AXLE|\}>2*S_{\mathit{eff}} \quad (1)$$

with Max1 representing the highest value and Max2 representing the second highest value out of the quantity of the amounts of the differences of the three considered rolling circumference differences $\{|\Delta DIAG|, |\Delta SIDE|, |\Delta AXLE|\}$. $S_{\mathit{eff}}$ designates in this regard the threshold for the pressure loss warning. This threshold $S_{\mathit{eff}}$ has previously been predefined in the indirectly measuring tire pressure monitoring system (DDS) only in a vehicle-related or tire-related manner. As will be described hereinbelow, this threshold $S_{\mathit{eff}}$ is fixed by the pressure-induced variations of the oscillating properties. If condition (1) is satisfied, a pressure loss warning will be issued, and the pressure loss warning will only be issued in the vehicle due to the not ideal conditions (noise or general disturbances) when there is protection by statistics such as a significant exceeding of the threshold, monitoring over a long time period, or other known statistical assessments.

To calculate the (warning) threshold $S_{\mathit{eff}}$, the rolling circumference differences ($\Delta$DIAG, $\Delta$SIDE, $\Delta$AXLE) are interpreted in such a manner that it is possible to determine the individual components of the rolling circumference variations $\Delta U_i$ for the different tires of the vehicle. In this arrangement, the values $\Delta U_i$ describe the extent of the individual rolling circumference deviations at any one of three wheels i related to the fourth wheel j. As the indirectly measuring tire pressure monitoring system (DDS) evaluates deviations of the wheels with respect to each other, this relation to a fourth wheel is necessary. $\Delta U_j=0$ consequently applies for the fourth wheel j. Hence, the relationship reads:

$$\{\Delta U_i, i=1,2,3\}=f(\Delta DIAG, \Delta SIDE, \Delta AXLE)$$

Which wheel j$\neq$i has experienced the minimum variation and, hence, becomes the reference quantity, is likewise the result of this consideration and will be explained in detail in the following. On the one hand, the values $\Delta U_i$ can be taken into account directly for the pressure loss warning, for what purpose it applies that $\Delta U_i$ must exceed the warning threshold for a rolling circumference variation $S_U$ and even the position concerned can be indicated to the driver. On the other hand, these wheel-related rolling circumference variations $\Delta U_i$ can be employed in the warning strategy in order to adapt the threshold $S_{\mathit{eff}}$ for a pressure loss warning in conjunction with the variations observed by means of a frequency analysis. The basic idea is that in the presence of a good correlation between both methods (DDS and frequency analysis), it is possible to change, especially reduce, the threshold $S_{\mathit{eff}}$ corresponding to the results of the frequency analysis. If, however, there is a poor correlation, meaning a contradiction, the threshold must not be changed, in particular it must not be reduced.

First, the exact procedure of determining the $\Delta U_i$-values is explained in detail. An auxiliary quantity $U_i$ is initially introduced which describes the rolling circumference variation at a position i related to the learnt condition. The wanted variable $\Delta U_i$ designates, however, the rolling circumference variation $U_i$ at the position i related to the rolling circumference variation $U_j$ at the position with the minimum rolling circumference variation j, hence, $\Delta U_i=U_i-U_j$ applies. To calculate the components of the rolling circumference variations $U_i$, allocated to the individual wheel position, the following linear combination is reviewed:

$$(\Delta DIAG, \Delta SIDE, \Delta AXLE)^T = \sum (U_i * Ri) \quad (2)$$

with $i = 0 \ldots 3$ (with i=0 . . . 3 meaning front left wheel, front right wheel, right rear wheel, left rear wheel)
and the pressure loss vectors Ri according to the following definition:

$R0=\{-1,-1,-1\}^T$ $R1=\{1,1,-1\}^T$ $R2=\{-1,1,1\}^T$ $R3=\{1,-1,1\}^T$

In this definition, the chosen signs of the vectors take into account that only pressure losses and, hence, rolling circumference reductions will have to be expected during operation, and these rolling circumference reductions are defined as positive $U_i$.

The equation system (2) comprises three equations with the four unknown quantities $U_i$ and can thus not be solved without additional condition. When it is initially presupposed that the wheel position j having the lowest pressure loss is known, the following substitution can take place:

$\Delta U_i=U_i-U_j$ with $U_j=\text{Min}(\{U_i\})$ $$(\Delta DIAG, \Delta SIDE, \Delta AXLE)^T = \sum (\Delta U_i * Ri) \quad (3)$$

with $i = 0 \ldots 3, i \neq j$

As the position j is unknown, the equation system must be solved four times by varying j with j=0 . . . 3. Out of the quantity of the four possible solutions $L_j$ $$L_j = \{\Delta U_i, i=0 \ldots 3, i \neq j\}_j, j=0 \ldots 3$$

only the solution $L_j$ is correct, for which all $\Delta U_i$ adopt positive values (as fixed by definition), i.e.

$$L_j = L_{j\_\text{solution}}: \Delta U_i \geq 0 \text{ for } i=0 \ldots 3, i \neq j$$

Thus, the correct solution $L_j$ comprises the individual components of the rolling circumference variations that are included in the warning strategy.

The indirectly measuring tire pressure monitoring system (DDS) identifies tire pressure loss from the fact that a basic warning threshold S is exceeded. This basic warning threshold S is predefined to the indirectly measuring tire pressure monitoring system (DDS), for example, depending on vehicle-related and/or tire-related circumstances. Compared thereto, an adapted threshold $S_{\textit{eff}}$ (see equation (1)) is employed in the method of the invention, and a pressure loss warning is issued when said threshold is exceeded. The adapted threshold $S_{\textit{eff}}$ is determined from the basic warning threshold S and a threshold decrease $\Delta S$, with the threshold decrease $\Delta S$ being influenced by the shift of the torsion natural frequency $\Delta f_p$ and a correlation value K.

$$S_{\textit{eff}} = S^*(1 - \Delta S(\Delta f_p, K)) \quad (4)$$

Thus, the adapted threshold $S_{\textit{eff}}$ depends, on the one hand, on the quality of the correlation between the results of the rolling circumference variations and the results for the frequency analysis. On the other hand, the magnitude of the pressure loss assessed by the frequency analysis sets the threshold adaptation. The consideration of the shift of the torsion natural frequency $\Delta f_p$ safeguards that the adaptation, especially the decrease, of the threshold $S_{\textit{eff}}$ takes place proportionally to the determined pressure loss of the frequency analysis, this means, greater shifts of the torsion natural frequency $\Delta f_p$ lead to a greater decrease of the adapted threshold $S_{\textit{eff}}$.

The correlation value K describes the correlation between the results for the shift of the torsion natural frequency $\Delta f_p$ and the results for the rolling circumference variation $\Delta U_i$ as described hereinabove. This correlation is preferably determined for all wheels, yet it can also be determined for each individual wheel. As described, the deviations of three wheels I are calculated in relation to the fourth wheel j in the indirectly measuring tire pressure monitoring system (DDS). Consequently, differences of the shift of the torsion natural frequency $\Delta f_p$ of each of the three wheels i related to this fourth wheel j must also be reviewed for the correlation, i.e. $\Delta f_{p,i} - \Delta f_{p,j}$. This correlation value K is used to evaluate whether both methods (DDS and frequency analysis) have found the same positions for the pressure losses as well as for the magnitude of the pressure losses. This correlation value K becomes high in the case of a good correspondence, while it becomes low or zero in the case of contradictions, so that no threshold decrease is performed then. When the system is designed in such a fashion that mutual plausibilisation of DDS and frequency analysis occurs, a pressure loss warning is also prevented in the case of an insufficient correlation.

The threshold decrease $\Delta S$ is calculated as follows:

$$\Delta S(\Delta f_p, K) = K^* \max 1(\{\Delta f_{p,i}\}) \quad (5)$$

with i=front left wheel, front right wheel, left rear wheel, right rear wheel, and $\max 1(\{\Delta f_{p,i}\})$ designates the greatest pressure loss found in the frequency analysis. For the calculation of K, $\Delta U_i$ and ($\Delta f_{p,i} - \Delta f_{p,j}$) are standardized to an individual threshold in such a way that a value of 100% corresponds to a warning threshold for a pressure loss warning by the individual system. Thus, $$\Delta U_{n,i} = \Delta U_i / S_U \text{ and } \Delta f_{p,n,i} = (\Delta f_{p,i} - \Delta f_{p,j}) / S_f$$

applies for the standardized values $\Delta U_n$, with $S_U$ designating the individual threshold for a warning of rolling circumference variations and $S_f$ designating the individual threshold for a warning of frequency variations.

Now, the correlation value is calculated with the standardized values $\Delta U_n$ and $\Delta f_{p,n}$ according to $$K = \frac{\sum (\Delta U_{n,i} * \Delta f_{p,n,i})}{\sqrt{\sum (\Delta U_{n,i})^2 * \sum (\Delta f_{p,n,i})^2}}$$

and i adopts three of the four possible values out of the group {front left wheel, right left wheel, left rear wheel, right rear wheel} so that $\Delta U_{n,i} = 0$ applies for the fourth value j. For the case that K becomes negative, the value is limited to zero, thereby preventing an extension of thresholds.

In the table following hereinbelow, the significance of the indicated equations is illustrated by way of numerical examples.

The wheel rotation which is evaluated in the known tire pressure monitoring system, and the oscillating property of the tire greatly depend on the tire dimensions (tire width, height of tire, tire diameter) and the material qualities (radial or diagonal tires, rubber compound of the tire, etc.) of the tire. As a vehicle is mostly equipped with a large number of tires of different sizes and different types of tires, it is suitable to consider these conditions in the method of the invention. This consideration is realized in a first step of the method of the invention by a learning phase in which the tire properties, in particular the pressure sensitivity ($df_p/dp$), of the tires used is learnt. Learning the individual pressure sensitivity ($df_p/dp$) of each one wheel of the vehicle is carried out by utilizing the pressure variations during heating or cooling of the tires during operation. When the tire properties are learnt, the wheel rotations, e.g. the variation of the rolling circumferences of the wheels and the oscillating properties of the tires are combined in a joint warning strategy, as has been described hereinabove. The criteria (DIAG, SIDE, AXLE, $\Delta f_p$) for the wheel rotations and the oscillating properties are learnt in speed and wheel torque ranges. The speed and wheel torque ranges for the wheel rotations and the oscillating properties need not be equal in this case. The criteria (DIAG, SIDE, AXLE, $\Delta f_p$) are evaluated likewise speed-responsively and wheel-torque responsively.

All known systems for tire pressure monitoring by way of frequency analysis are based on the physical useful effect of a pressure-induced shift of a characteristic torsion natural frequency. The exact position of the torsion natural frequency $f_p$ just as well as the pressure sensitivity $df_p/dp$ is a quality of the tire, thus both variables adopt different values as regards different types of tires. Typically, the torsion natural frequency $f_p$ for different tires can vary in the range from roughly 33 to roughly 48 hertz when exposed to the same pressure. The values of the pressure sensitivity $df_p/dp$ vary for the same tires in the range from roughly 4 up to roughly 8 hertz per 1 bar tire inflation pressure.

As the type of tire is generally not known and usually a great number of tire dimensions and types of tires may be employed for normal vehicles, it is imperative for a conventional system to tolerate this fact. On the one hand, this has as a result that the frequency analysis must be executed in a wide frequency range, i.e. in this case e.g. approximately 20 up to about 60 hertz with a high resolution, e.g. 0.5 hertz (corresponds to 81 frequencies). The number of frequencies to be taken into account determines directly the demands placed on the computer on which the algorithm is implemented. This concerns above all the working memory (RAM) and the operation time.

If, as provided in a second favorable embodiment, at first only the approximate frequency position of the torsion natural frequency $f_p$ is determined in a preceding learning phase, the method of the invention saves resources in particular. In this arrangement, initially the rough position of the torsion natural frequency $f_p$ is determined in a brief first learning phase in a wide frequency range (e.g. 20 to 60 hertz) with a coarse frequency resolution, e.g. 1 hertz (corresponds to 41 frequency steps). Subsequently, the relevant frequency range for the actual learning phase is fixed, e.g. at $f_p$−15 hertz<f<$f_p$+5 hertz, and in this case a frequency resolution of 0.5 hertz is possible in order to utilize the same number of frequency steps (41). Thus, this method allows halving the necessary resources, while having to tolerate only the shortcoming of a slightly longer learning phase.

The dependency of the pressure sensitivity $df_p/dp$ on the tire in up-to-date systems, which trigger a pressure warning directly based on the results of the frequency analysis, leads to the result that fixed minimum pressure warning thresholds cannot be maintained. In the application of the algorithm, it is only possible to employ a fixed warning threshold with respect to the frequency shift, e.g. $\Delta f_{warn}$=3 hertz, which is chosen as a compromise of the possible tires for the vehicle under review. Depending on the tire, this warning threshold leads to different warning minimum pressures such as −0.75 bar for the insusceptible tire having a pressure sensitivity of $df_p/dp$=4 hertz/bar and e.g. −0.375 bar for susceptible tires having the double pressure sensitivity of $df_p/dp$=8 hertz/bar.

A third favorable embodiment of the method of the invention allows achieving a minimum pressure warning at equal pressures for all tires. In this embodiment, the frequency analysis is not only used for adapting the warning thresholds of the DDS, but is employed directly for the pressure warning. It is characteristic that only one start value, e.g. 3 hertz, is stored in the algorithm for the frequency shift $\Delta f_{warn}$ for which a warning shall be issued. The actually used warning threshold $S_f$ is then adapted depending on the tire in a learning algorithm that is implemented in addition. As this occurs, the effect is utilized that, due to flexing work, tires can heat up so much during operation that pressure increase of up to 0.3 bar develops. If, for example, a tire is initially learnt in a largely cold manner at a vehicle speed of 40 km/h and is then operated being warm subsequent to a long freeway drive again at 40 km/h, an increase of the torsion natural frequency can be detected due to the higher inflation pressure. The susceptible tire referred to in the above example will then show a shift of the torsion natural frequency by about 2.4 hertz, yet the insusceptible tire only about 1.2 hertz. When now the tire cools down again due to commencing rain, this has exactly the opposite effect.

Thus, a decisive condition for utilizing this effect is the ability of precisely detecting when the tires are heated or when the tires are cold. In the method of the invention, the effect is used that heating and cooling actions always concern all four tires on the vehicle, that means, when a uniform increase of the torsion natural frequency $f_p$ is detected on all of the four wheels, one may assume that the tires are warm. If, on the contrary, the torsion natural frequency $f_p$ decreases simultaneously on all four wheels and then remains on a value, cold tires e.g. due to rain or a general cooling may be assumed. If, compared thereto, the torsion natural frequency $f_p$ reduces simultaneously on all four wheels and does not remain on a value, one may assume a simultaneous pressure loss on all four wheels. Changes, which concern only individual tires, are not utilized. This means that not only the absolute value of the torsion natural frequency is taken into account in this arrangement, but that in particular the behavior of the torsion national frequencies as a function of time is assessed.

In a first straightforward design of the third embodiment, it is thus possible to take into account merely maximum and minimum values of the torsion natural frequency $f_p$ when making a decision about the sensitivity. It is assumed in this respect that each one condition (warm and cold) will occur one time in normal driving maneuvers.

In a second, more accurate design of the third embodiment, the outside temperature is used in addition in order to be able to evaluate the current temperature level compared to the temperature level at the time of the reset, as well as the heating potential dependent on the condition of the environment. Provided the algorithm is implemented in a brake control device, the temperature can be used as the outside temperature which is measured in the control device by means of the sensor that is provided already. Otherwise, the outside temperature of the vehicle bus, e.g. CAN, can be used. Besides, the flexing energy of the tires is evaluated during each ignition cycle, which depends mainly on the speed profile (e.g. integration of the rotational energies). The expected pressure increase can be assessed on this basis.

In a third design of the third embodiment, the immobilization time of the vehicle before the current ignition cycle is additionally taken into account in order to evaluate in a more reliable manner whether the vehicle was started with warm or cold tires. This immobilization time can e.g. be found out by an after-running of the computer beyond the 'ignition off' signal. Presumably, an after-running of maximally 30 minutes will be sufficient in practice in order to treat the vehicle battery with care; or the time is read in directly by the vehicle bus, e.g. CAN, if available. To support the assumption of the tires cooling due to rain, the vehicle bus can read in signals of a rain sensor in addition.

The combination of the indirectly measuring tire pressure monitoring system (DDS) with the frequency analysis (FA) allows achieving an improved accuracy for detecting pressure losses as well as increasing the robustness of the overall system with regard to erroneous warnings. This is achieved because the information of the individual systems DDS and FA is respectively used for the mutual protection of a pressure warning issued by a single system. This can be done, for example, by using the correlation value K described hereinabove. The mutual protection is applied, however, only for insignificant pressure losses, which lie within the limits of fine warning thresholds for both systems (DDS and FA). To be able to reliably warn of major pressure losses in any case, a coarse warning threshold is used for both systems (DDS and FA). When this threshold is exceeded, protection by the other system is no longer necessary, but a warning is always issued.

The strategy, according to which a warning is indicated to the driver in this embodiment depending on the system states of FA and DDS, is summarized in the following tables. While the first table explains the coarse logic, numerical examples are mentioned in the second table. The percentage indicated shows how much the respective criterion of DDS (DIAG, SIDE, AXLE) and FA ($\Delta f_p$) has approached the warning threshold. In this example, 100% is the fine threshold, 150% of the fine threshold corresponds to the coarse threshold. Utilizing 50% of the fine threshold is sufficient as a confirmation.

| Warning to driver | State of DDS | State of FA |
|---|---|---|
| yes | optional | warning (coarse threshold) |
| yes | warning (coarse threshold) | Optional |
| yes | warning (fine threshold) | warning threshold (fine) at min. one tire > x % (e.g. x = 50) |
| no | warning (fine threshold) | warning threshold (fine) at no tire > x % (e.g. x = 50) |
| no | DDS wheel detection shows other position(s), or warning threshold or threshold (fine) for wheel detection for tires concerned < x % (e.g. x = 50 or dependent on the state of FA) | warning (fine threshold) for one to three positions |
| yes | threshold (fine) for wheel detection for tires concerned < x % (e.g. x = 50 or dependent on the state of FA) | warning (fine threshold) for one to three positions |
| yes | Optional | warning (fine threshold) at all four tires |

For many vehicles, different sensitivities occur with respect to pressure loss for the driven axle and the freely rolling axle. As has been described hereinabove, this applies generally to different positions for the frequency analysis and for DDS, i.e. the driven axle can be more sensitive for the frequency analysis but insensitive for DDS. In this case, the system can be laid out in such a fashion that the threshold values used for the pressure warning $S_U$ and $S_f$ are used related to the axles.

The invention claimed is:

1. A method for indirect tire pressure monitoring, the method comprising:
   learning test variables (DIAG, SIDE, and AXLE) where DIAG as for the wheel rotation of the two diagonally opposite wheel, SIDE as for the wheel rotation on the side of vehicle, AXLE as for the wheel rotation of the one axle, which describe rotational movements of wheels
   learning at least one torsion natural frequency fp for at least one tire from oscillation behavior of individual tires wherein during the learning
   (1) initially only a rough position of the torsion natural frequency fp is determined, and
   (2) subsequently a range is defined around the position of the torsion natural frequency fp, in which a precise position of the torsion natural frequency fP is determined with a frequency resolution that is at least twice

| Number of pressure losses | Δf (in % of the warning threshold, $Δf_{p,n}$) | | | | DDS (% warning threshold, $ΔU_{i,n}$) | | | | Warning yes/no | Comments |
|---|---|---|---|---|---|---|---|---|---|---|
| | FL | FR | RL | RR | FL | FR | RL | RR | | |
| 1 | 100 | 0 | 0 | 0 | 50 | 0 | 0 | 0 | yes | DDS confirms tendency, fine warning threshold is allowed |
| 1 | 0 | 100 | 0 | 0 | 0 | 10 | 0 | 0 | no | DDS does not confirm tendency, only coarse warning threshold |
| 1 | 0 | 0 | 150 | 0 | 0 | 0 | 10 | 0 | yes | in excess of coarse warning threshold, confirmation by DDS not necessary |
| 2 | 100 | 100 | 0 | 0 | 50 | 50 | 0 | 0 | yes | DDS confirms tendency, fine warning threshold is allowed |
| 2 | 0 | 0 | 100 | 100 | 0 | 0 | 10 | 10 | No | DDS does not confirm tendency, only coarse warning threshold |
| 2 | 0 | 150 | 0 | 150 | 0 | 10 | 0 | 10 | yes | in excess of coarse warning threshold, confirmation by DDS not necessary |
| 3 | 100 | 100 | 100 | 0 | 50 | 50 | 50 | 0 | yes | |
| 3 | 0 | 100 | 100 | 100 | 0 | 10 | 10 | 10 | no | DDS does not confirm tendency, only coarse warning threshold |
| 3 | 150 | 100 | 100 | 0 | 10 | 10 | 10 | 0 | yes | in excess of coarse warning threshold, confirmation by DDS not necessary |
| 4 | 100 | 100 | 100 | 100 | 0 | 0 | 0 | 0 | yes | warning with fine threshold, because confirmed four times |
| 4 | 75 | 125 | 75 | 75 | 0 | 20 | 10 | 10 | yes | warning with fine threshold, because confirmed four times | a first frequency resolution of the rough position of the torsion natural frequency fp;

determining at least one shift of the torsion natural frequency $\Delta fP$ from at least one actually determined torsion natural frequency and from the at least one learnt torsion natural frequency; and combining rolling circumference differences ($\Delta DIAG$, $\Delta SIDE$, $\Delta AXLE$) with the at least one shift of the torsion natural frequency $\Delta fp$ in a joint warning strategy for detecting and warning of tire inflation pressure loss.

2. A method according to claim 1, wherein either of the learning operations is not started until an automatically or manually generated signal (reset).

3. A method according to claim 1, wherein one of the learning operations is executed while the tires heat up or cool down.

4. A method according to claim 3, wherein a complete heating or cooling of the tires is detected from a uniform increase or reduction of the torsion natural frequencies fp of all tires to an almost constant final value.

5. A method according to claim 3, wherein a change of an outside or ambient temperature is evaluated with respect to the heating or cooling of the tires.

6. A method according to claim 3, wherein a length of a vehicle immobilization time allows obtaining information about a condition of the tires.

7. A method according to claim 1, wherein one of the learning operations is executed in several different speed intervals, or wheel torque intervals, or lateral acceleration intervals.

8. A method according to claim 1, wherein a warning regarding tire inflation pressure loss is issued when at least one rolling circumference difference ($\Delta DIAG$, $\Delta SIDE$, $\Delta AXLE$) or at least one shift of the torsion natural frequency $\Delta fP$ exceeds a previously fixed coarse threshold.

9. A method according to claim 1, wherein a warning regarding tire inflation pressure loss is issued when the shifts of the torsion natural frequencies $\Delta fP$ of all wheels exceed a previously fixed fine threshold.

10. A method according to claim 1, wherein a warning regarding tire inflation pressure loss is issued when at least one rolling circumference difference ($\Delta DIAG$, $\Delta SIDE$, $\Delta AXLE$) as well as at least one shift of the torsion natural frequency $\Delta fP$ exceeds previously fixed fine thresholds.

11. A method according to claim 10, wherein a warning regarding tire inflation pressure loss is issued only when the correlation between the rolling circumference differences ($\Delta DIAG$, $\Delta SIDE$, $\Delta AXLE$) and the shifts of the torsion natural frequencies $\Delta fP$ exceeds a predetermined limit value which indicates tire inflation pressure loss with an appropriate likelihood.

12. A method according to claim 1, wherein in a joint warning strategy, the thresholds of the rolling circumference differences ($\Delta DIAG$, $\Delta SIDE$, $\Delta AXLE$) for warning of tire inflation pressure loss are adapted depending on the shift of the torsion natural frequency $\Delta fP$.

13. A method according to claim 1, wherein in a joint warning strategy, the thresholds of the rolling circumference differences ($\Delta DIAG$, $\Delta SIDE$, $\Delta AXLE$) for warning of tire inflation pressure loss are adapted depending on the shift of the torsion natural frequency $\Delta fP$ and on the correlation between the rolling circumference differences ($\Delta DIAG$, $\Delta SIDE$, $\Delta AXLE$), and on the shifts of the torsion natural frequency $\Delta fP$.

* * * * *